Jan. 24, 1939.  W. B. BARNES  2,144,788
OVERDRIVE TRANSMISSION AND CLUTCH
Filed Dec. 19, 1934  3 Sheets-Sheet 1
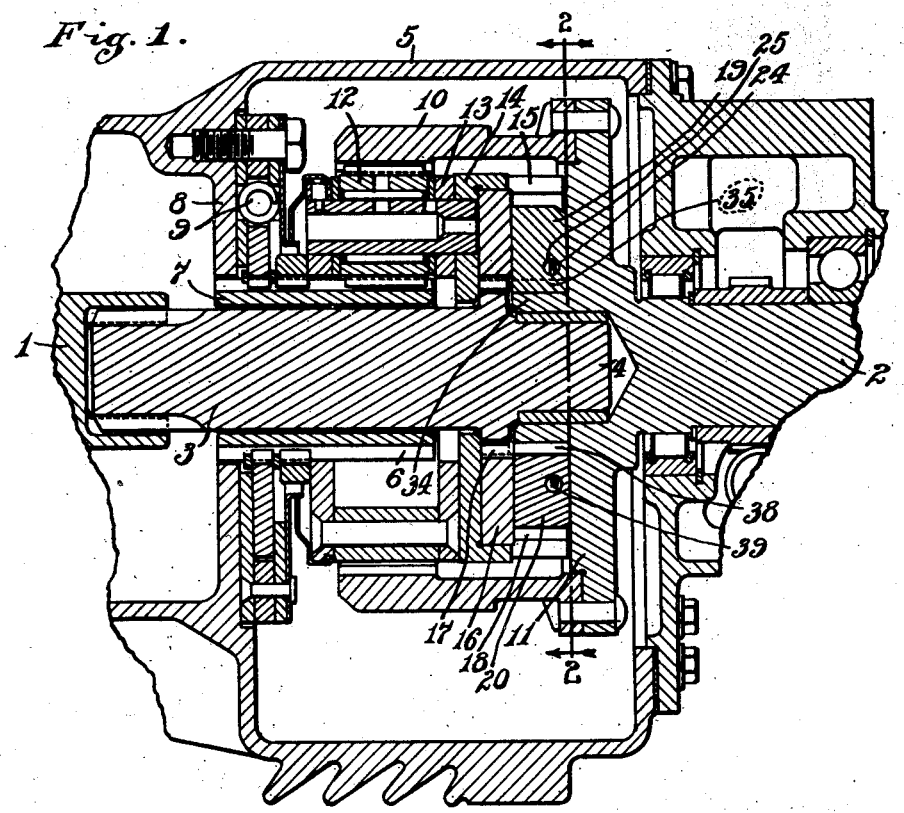
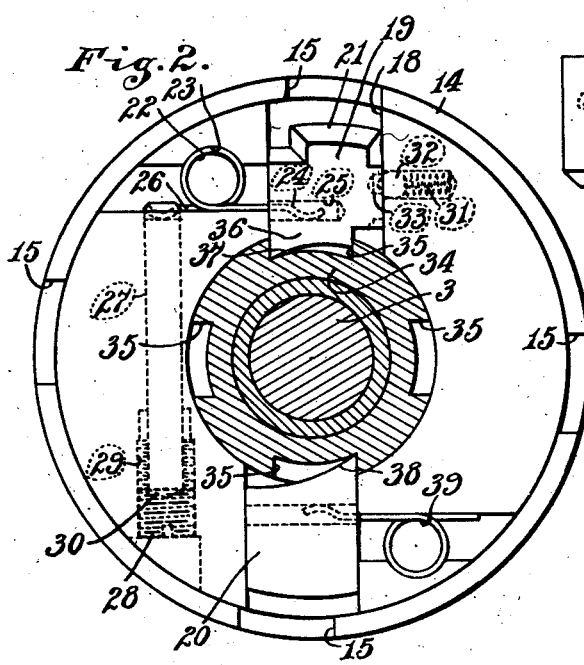
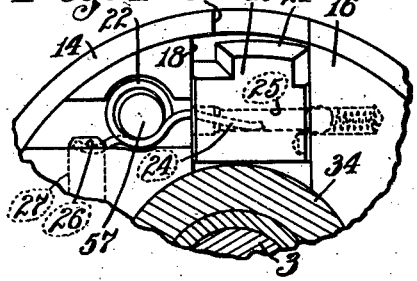
INVENTOR
William B. Barnes,
BY
Hood & Hahn
ATTORNEYS Jan. 24, 1939.  W. B. BARNES  2,144,788
OVERDRIVE TRANSMISSION AND CLUTCH
Filed Dec. 19, 1934  3 Sheets-Sheet 2
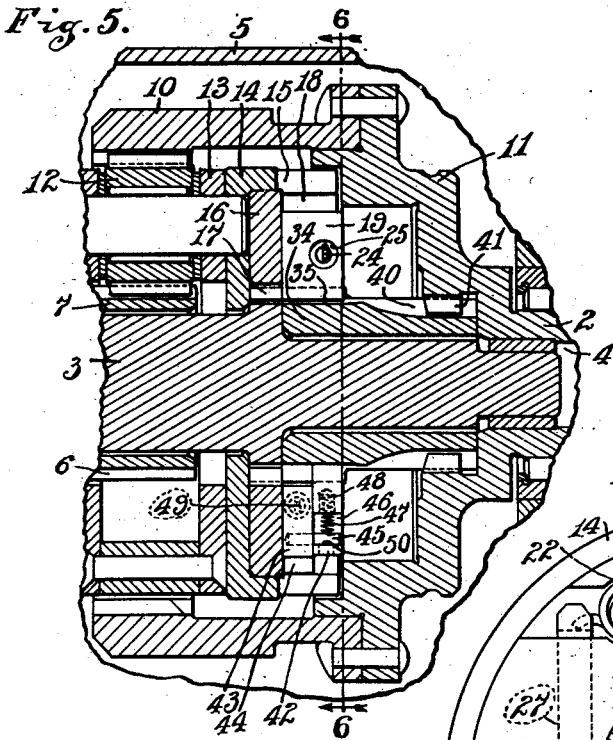
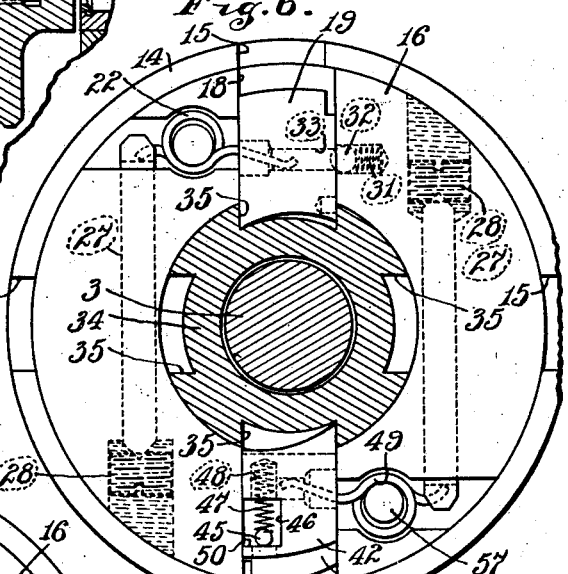
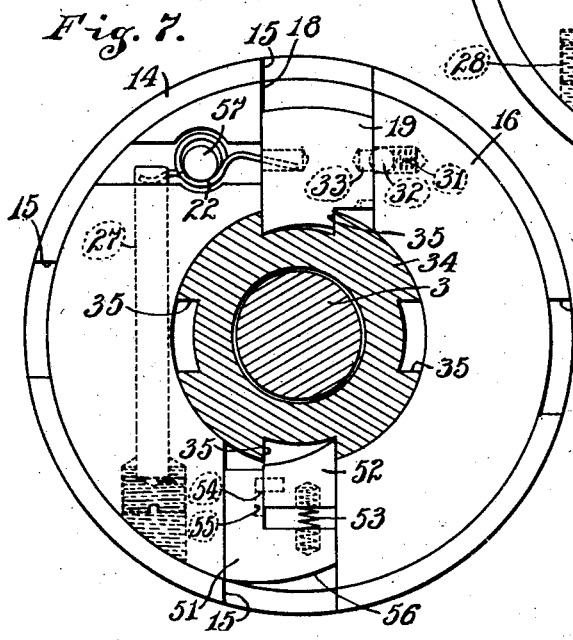
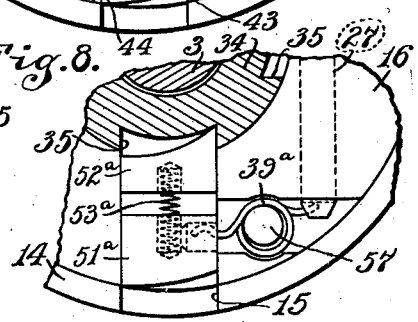
INVENTOR
William B. Barnes,
BY Hood + Hahn
ATTORNEYS Jan. 24, 1939.  W. B. BARNES  2,144,788
OVERDRIVE TRANSMISSION AND CLUTCH
Filed Dec. 19, 1934   3 Sheets-Sheet 3
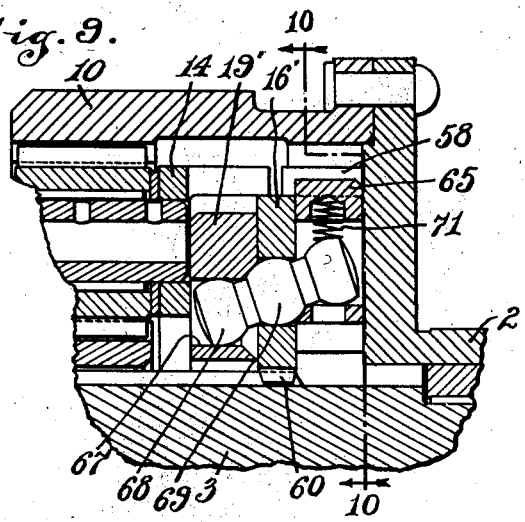
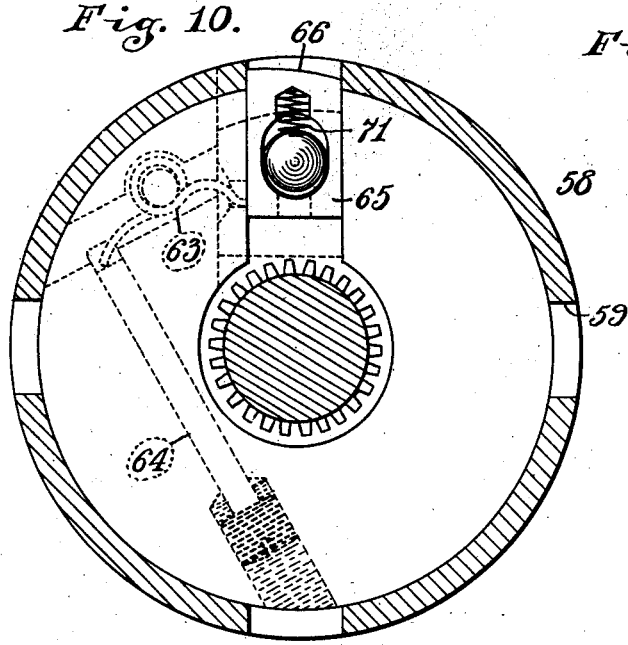
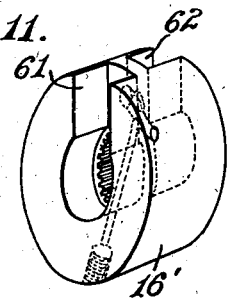
INVENTOR
William B. Barnes,
BY
Hood + Hahn
ATTORNEYS Patented Jan. 24, 1939

2,144,788

UNITED STATES PATENT OFFICE 2,144,788

OVERDRIVE TRANSMISSION AND CLUTCH

William B. Barnes, Indianapolis, Ind., assignor to Barnes Motor Developments Company, Muncie, Ind., a partnership composed of said William B. Barnes and Freda Arthur Barnes Application December 19, 1934, Serial No. 758,215

25 Claims. (Cl. 74—260)

My invention relates to improvements in transmissions for automobiles and the like, particularly directed towards an overspeed transmission which is adapted to be automatically thrown into operation when the speed of the driving and driven shafts reach a predetermined point and to be thrown out of operation when the speed of the shafts drops below a predetermined point.

One of the objects of my invention is to provide an improved form of clutching mechanism for establishing the overspeed drive relation between the shafts and for reestablishing the direct drive relation between the shafts.

For the purpose of disclosing my invention I have illustrated certain embodiments thereof in the accompanying drawings, in which Fig. 1 is a longitudinal sectional view of a transmission embodying my invention;

Fig. 2 is a sectional view on the line 2—2 of Fig. 1;

Fig. 3 is a detail plan of the structure illustrated in Fig. 2;

Fig. 4 is a detail of a modified form of my clutch structure;

Fig. 5 is a longitudinal detail section of a further modification of my invention;

Fig. 6 is a section on the line 6—6 of the clutch of Fig. 5;

Fig. 7 is a modification of the type of clutch shown in Fig. 6;

Fig. 8 is a further modification of the type of clutch shown in Fig. 6;

Fig. 9 is a detail section of a further modification;

Fig. 10 is a section on line 10—10 of Fig. 9, and

Fig. 11 is a perspective of the core member of the clutch.

In the embodiment of the invention as illustrated, I provide the usual driving shaft 1 which is driven from the engine in the usual manner, either through a direct acting clutch controlled by the operator or through the instrumentality of additional speed changing mechanism. The driven shaft 2 is adapted to be connected with the driving wheels of the vehicle through the usual differential gearing. The shaft 1 has preferably in splined driving relation therewith an intermediate shaft 3 which, at its rear end, is piloted as at 4 in an opening in the front end of the shaft 2, suitable needle or roller bearings being interposed between the two shafts.

The overspeed drive is enclosed in a suitable casing 5. Within this casing is mounted a stationary sun gear 6 formed on the end of a sleeve 7 surrounding the intermediate shaft 3 and this sleeve 7 is anchored to the end wall 8 of the casing 5 by suitable vibration absorbing mechanism 9. The ring gear 10 of the overspeed planetary drive is connected directly to the driven shaft 2 through the instrumentality of an annular head 11 formed on the end of this shaft. Interposed between the ring gear 10 and the sun gear 6 are a plurality of pinion gears 12, the pinions of which are mounted on shafts carried in a pinion carrier 13. This pinion carrier is provided with one member 14 of a centrifugally operated positive clutch and this member 14 includes an annular ring provided with suitable clutch recesses or openings 15 to receive the clutch dogs of the other member of the clutch.

The opposite member of this centrifugally operated clutch comprises a suitable head 16 surrounding the intermediate shaft 3 and having a toothed connection 17 with this shaft whereby the clutch member 16 is driven by the driving and intermediate shaft 3. Arranged in radial slots 18 in the rear face of the member 16 are clutching dogs 19 and 20.

Referring particularly to the dog 19, which is the lock-up dog for the forward overspeed drive, this dog is adapted to be thrown outwardly under the influence of centrifugal force and its top surface is slightly cammed as at 21 so that when the driving and driven parts of the clutch are operating at asynchronous speed, the dog 19 will ratchet over the recesses or slots 15 and will not engage. As soon, however, as the members 14 and 16 reach synchronism the dog 19, under the action of centrifugal force, will slip into one of the recesses 15 locking the two parts together to establish driving relation between the drive shaft and the pinion carrier of the planetary gear and thus establish an overspeed drive to the driven shaft 2.

The dog is restrained in its retracted position by means of a suitable spring mechanism which is extremely simple in its construction. This mechanism consists merely of a coiled spring 22 lying in a recess 23 in the rear face of the dog. One end 24 of this spring is inserted in an opening 25 which may be drilled through the dog or otherwise formed. This opening 25 is large enough to permit a certain amount of clearance between its top and bottom walls and the spring. The opposite end 26 of this coiled spring rests upon and in an end slot of an adjusting pin 27. This pin is inserted in position through a suitable bore in the walls of the clutch member and at its lower end is socketed in an adjusting screw 55

28 screw-threaded in an enlarged portion 29 of the pin bore. The bottom of this pin 27 is more or less knife edged as at 30 and this knife edge rests in a corresponding slot in the screw 28 to thereby lock or hold the screw against rotation after it has once been set. It is obvious that adjustment of the tension of the spring 22 may readily be obtained by the adjustment of the screw 28 and that the construction and arrangement of the parts are extremely simple and comparatively cheap to manufacture.

In order to obtain somewhat of a snap action of the dog 19 both towards outer and inner positions, I provide in a recess in the member 16 a coiled spring 31 bearing upon a poppet 32 adapted to take into a recess 33 when the dog is in its retracted position or beneath the edge of the dog when the dog is in its projected position.

An annular extension 34 on the shaft 2 projects beneath the dog 19 and this projection is provided with a series of dog-receiving recesses 35, into which the lower end 36 of the dog 19 is adapted to project, when the dog is in its retracted position. To insure the engagement of the dog 19 in the recesses 35, the lower end of the dog is provided with a dog end 37.

The second dog 20 in the driving member 16 is so wide at its outer end that it will not enter into engagement with the recesses 15 of the other member of the centrifugal clutch, but this dog at its inner end is provided with a dog end 38 rather sharply inclined to act somewhat as a ratchet member to insure the locking of the member 16 to the annular flange 34 and thus bring the two parts into more or less stationary relation, under certain predetermined conditions, so that the dog 19, at its inner end, may engage into one of the recesses 35. This dog 20 is adapted to move outwardly to disengaging position under the influence of centrifugal force and is retracted to its engaging position by a coiled spring 39 similar in construction to the coiled spring 22.

In operation, when the speed of the driving shaft 1 reaches a predetermined point, say in an automobile, when the vehicle reaches approximately forty miles an hour, centrifugal force will be great enough to overcome the combined action of the spring 22 and the restraining poppet 32 to permit the dog to move outwardly. However, due to the fact that the overspeed drive and particularly the pinion carrier, under these conditions is being driven from the shaft 2, the clutch member 14 of the centrifugal shaft will be moving at a slower speed than the clutch member 16, and as a result the dogs 19 will ratchet over the recesses 15 and not engage. However, when the operator removes his foot from the accelerator and permits the speed of the engine to die down, thereby permitting the speeds of the shafts 1 and 3 to likewise drop, until the speed of the member 16 is in synchronism with the speed of the member 14, the dog 19 will move into the recesses 15 and into engaged position. Thereafter, upon acceleration of the shafts 1 and 3 the pinion carrier will be driven, and through the planetary gear drive the shaft 2 will be driven at a greater speed than the shaft 1.

It may sometimes happen that when the parts are speeded up to cause the dog 19 to move into disengaging position relative to the recesses 35, the operator may not permit sufficient time to elapse for the shaft 3 to drop to a speed to synchronize the member 14 of the clutch and the member 16 of the clutch before again accelerating the shaft 3. Under these circumstances, assuming that the speed is still sufficiently high to maintain the dog 19 in its outer or engaging position, the portion 36 of the dog will be disengaged from the driven shaft 2 and the dog 19 will not be in engagement with the pinion carrier portion of the clutch. Therefore the shafts would be entirely disengaged and the operator might by pressing down on the accelerator pedal speed up his engine, obtaining a racing of the engine without any engagement of the parts. Under these circumstances, due to the fact that the spring 39 is sufficiently stronger than the spring 22 to prevent the dog 20 from moving outward under centrifugal force which would move the dog 19 outward, the dog 20 would act as a ratchet and its nose 38 engage with the recess 35, thus at least establishing a direct drive between the engine or driving shaft and the driven shaft so that unnecessary racing of the engine would be prevented. Due to the fact that the dog 20 with its end 38 is in the form of a ratcheting dog when the speed of the shaft 3 is dropped downwardly this dog will of course merely ratchet over the recesses 35 without engaging.

In Fig. 4 I have illustrated a modified form of the clutch shown in Fig. 2 wherein the dog 19 is adapted for use only for connecting the members 16 and 14. In other words the lower end of the dog is cut straight across and does not perform any function of locking the shafts together directly.

In the structure illustrated in Fig. 2 it will be noted that the dog 20 is constantly ratcheting over the recesses 35 even though the dog 19 is in engagement with the recess 15. This, under certain driving conditions, may become objectionable and in order to insure a ratcheting effect so long as the dog 19 is not in engagement with one of the recesses 15 but after such engagement has been established, discontinue the ratcheting effect, I provide the structure illustrated in Figs. 5 to 8.

Referring first to the structures illustrated in Figs. 5 to 6, it will be noted that instead of making the annular member 34 a part of the shaft 2, as in Fig. 1, this member is a separate sleeve having teeth 40 which engage in teeth 41 on the shaft 2. It is obvious that this arrangement is equally applicable to the structures illustrated in Figs. 1 to 3.

In the structure illustrated in Figs. 5 and 6 I provide a ratcheting dog 42 operating in the same manner as does the ratcheting dog 20. It will be noted that this ratcheting dog, like the dog 20, is sufficiently wide to prevent its ever entering any of the recesses 15. In addition to the dog 42 I provide a second dog 43 behind the dog 42. This dog 43 has its upper end narrowed sufficiently as at 44 to permit it to engage in the recesses 15 and this dog is provided with a pin 45 projecting into a cut-out portion 46 of the dog 42. A coiled spring 47 is interposed between this pin 45 and the bottom of a recess of a pocket 48 in the dog 42. The dog 43 is retained in its retracted position by a coiled spring 49 of about the same retractile strength as the coiled spring 22 so that under centrifugal force the dog 43 will move outwardly with the dog 19. If the dog 43 moves outwardly but fails to engage in one of the recesses 15 there will be sufficient tension on the spring 47 to maintain the dog 42 in its ratcheting position. As soon however as the dog 43 moves into engagement with one of the recesses 15 the pin 45 will engage the top 50 of the slot 46 and pull the dog 42 out of ratcheting position.

In Fig. 7 I have illustrated a still further modification of my invention. In this structure the dog 19 is substantially the same as the dog 19 in Fig. 6. That is, it is adapted, under predetermined conditions, when the two parts of the clutch are in synchronism and the speed condition is correct, to engage in one of the engaging recesses 15.

A second dog 51 is provided and this dog has a section 52 which constitutes an engaging dog for engaging in one of the recesses 35. This section 52 is in the form of a ratchet dog and is biased into engaging position by a coiled spring 53 interposed between a shoulder of the dog 51 and the top of the section 52. This section 52 is also provided with a pin 54 operating in an elongated recess 55 in the section 51. The section 51 at its top is cammed as at 56 so that this section 51 will not engage in one of the recesses 15 in the other member of the clutch until the parts are in synchronism, or until the dog 19 has engaged in one of the other recesses 15.

The arrangement is such that until the dog 51 does move to the outermost limits of its stroke and into the slot 15, the member 52 will ratchet in the slot 35 under the influence of the coiled spring 53. However, when the dog 51 does engage in one of the slots 52 this outward movement of the dog 51 will cause the bottom of the slot 55 to engage the pin 54 and pull the section 52 out of ratcheting position. It will be borne in mind that the dog-carrying member of the clutch is operated from the driving shaft, that the member having the recesses 15 is drivingly connected with the pinion carrier of the planetary gear and that the member carrying the recesses 35 is either a part of or directly connected to the driven shaft. If, assuming that it is desired to establish the overspeed drive and the driven shaft has been speeded up to the critical speed at which the dog 19 will throw out under centrifugal force and the operator removes his foot from the accelerator for the purpose of permitting the shaft 3 to slow down to permit the dog members to reach synchronism, as heretofore described, but does not wait a sufficient interval and then again increases the speed of the driving shaft 3, before the dog 19 has engaged, the dog 52 will engage in one of the recesses 35 and there will be a direct drive established even though the dog 19 has become disengaged from the recess 35 and has not yet engaged in the recess 15. The dog 51 cannot engage in one of the recesses because the dog-carrying member will be operating at a greater speed than the recess 15 carrying member so that the spring 53 will cause the dog member 52 to ratchet and engage in one of the recesses.

In Fig. 8 I have illustrated a further modification of my structure wherein the dog 51a, is substantially like the dog 51 except that it is comparatively short and the section 52a is of substantially the same width as the section 51a, a coiled spring 53a being interposed between the two sections. In this instance the section 51a is also retained against moving outwardly under centrifugal force by a coiled spring 39a and associated parts, similar to the dog in Fig. 2.

In some instances instead of setting the spring 22 in a recess as is illustrated in Fig. 2, I may prefer to anchor the spring, either 22 or 29, on a pin 57 extending laterally from one face of the member 16 through the spring 22 or the spring 39, or both.

In Figs. 9, 10 and 11 I have shown a still further modification of the clutch embodiment. Referring to the structure illustrated in these figures, the driven shaft 2 has secured thereto the ring gear 10 as in Fig. 1. The planetary gearing is the same as in Fig. 1, and the member 14 of the centrifugal clutch is the same as in Fig. 1, being connected to the pinion carrier of the planetary gearing.

The opposite member 16' of the structure illustrated in Figs. 9 to 11 corresponding to the head 16 and which may be referred to as the core member is somewhat different. In the structure illustrated in Figs. 9 to 11 the driven shaft 2 is provided with a secondary clutch annulus 58 having notches 59 therein which is of the same radius as the clutch member 14. The core member 16' is provided with internal teeth 60 by which it is connected to the driving section 3 of the driving shaft and this core member is provided with a pair of radial slots 61 and 62 arranged side by side. In one of these slots, 61, is arranged a dog 19' adapted to cooperate with the member 14 of the centrifugal clutch in the same manner as the dog 19 illustrated in Fig. 4. This dog is held in its retracted position by a coiled spring 63 of the same type as that illustrated in Fig. 4 and adjusted, as to tension by an adjusting screw 64 similar to the adjusting screw 27. In the opposite slot 62 is provided a dog 65 cammed off at its top surface as at 66. The dog 19' is provided with an opening 67 therein adapted to receive one end 68 of a lever having a rounded bearing point 69 in the web between the slots 61 and 62. The opposite end of this lever engages in an elongated slot in the dog 65 and interposed between the top of this lever and the dog is a light spring 71. With this construction when the dog 19' is in its retracted position, under the influence of the spring 63, the lever will tend to project the dog 65 so that it will engage in one of the slots 59, thus establishing a direct drive between the shaft 3 and the shaft 2. When the speed of the parts reaches a critical point when the dog 19' moves outwardly under centrifugal force into engaging position, the lever will draw the dog 65 inwardly to permit the lower portion of the cam top 66 of the dog to clear the bottom edge of its slot 59, thereby permitting the parts to rest, but, maintaining a more or less driving connection between the shafts 3 and 2. As soon, however, as the dog 19' completes its engaging movement, that is, as soon as the dog 19' enters its accompanying slot in the member 14 the dog 65 under the influence of the lever will be pulled all of the way in and be completely disengaged from its slot.

I claim as my invention:

1. In a transmission, the combination with driving and driven shafts and speed-changing gear for driving said driven shaft from the driving shaft at a different speed ratio, of a centrifugally operated clutch for establishing driving relation between said shafts including a centrifugally operated clutching dog connecting said driving and driven shafts directly when in retracted position and connecting said shafts through said gearing when moved to engaging position under the influence of centrifugal force.

2. In a transmission, the combination with driving and driven shafts and speed-changing gear for driving said driven shaft from the driving shaft at different speed ratios, of a centrifugally operated clutch for establishing driving relation between said shafts including one member connected to said speed-changing gearing, a second member connected to said driven shaft, and a third member connected to the driving shaft and including a centrifugally operated dog engaging said second member when in retracted position and said first member when moved to engaging position under the action of centrifugal force.

3. In a transmission, the combination with driving and driven shafts and speed-changing gearing of the planetary type for driving said driven shaft from the driving shaft at different speed ratios, of a centrifugally operated clutch for establishing driving relation between said shafts including a member connected to said planetary gearing, a second member directly connected to said driven shaft, and a third member drivingly connected to the driving shaft and including a centrifugally operated dog engaging the second member of the clutch when in its retracted position and the first member of the clutch when moved into engaging position under the action of centrifugal force.

4. In a transmission, the combination with driving and driven shafts and speed-changing gearing of the planetary gear type, the ring gear of said gearing being connected to the driven shaft of a centrifugally operated clutch for establishing driving relation between said shafts including one member connected to the pinion carrier of said gearing, a second member directly connected to the driven shaft, and a third member drivingly connected to the driving shaft and including a centrifugally operated dog engaging the second member of the clutch when in its retracted position and engaging the first member of the clutch when moved to engaging position under the action of centrifugal force.

5. In a transmission, the combination with driving and driven shafts and speed-changing gearing for driving said driven shaft from the driving shaft at different speed ratios, of a centrifugally operated clutch including a member connected to the transmission gearing, a second member connected to the driven shaft, and a third member drivingly connected with the driving shaft, a centrifugally operated dog engaging in its retracted position the second member of the clutch and in its projected position the first member of the clutch carried by said third member of the clutch, and a second one-way engaging dog centrifugally moved out of engagement with the second member of the clutch and adapted when moved towards its retracted position to engage said second member of the clutch when the speed of the driven shaft tends to move faster than the speed of the driving shaft.

6. In a transmission, the combination of a driving and driven shaft, a planetary gearing for establishing driving relation between said shafts at different speed ratios, a ring gear of said gearing being connected to the driven shaft, a centrifugally operated clutch for establishing driving relation between the said shafts including one member connected to the pinion carrier of said planetary gearing, a second member connected to the driven shaft, and a third drivingly connected to the driving shaft and including a centrifugally operated dog establishing two-way direct driving connection with the second member of the clutch when in retracted position and drivingly engaging the first member of the clutch when projected under the action of centrifugal force, and a second dog establishing one-way direct drive between the third member of the clutch and the second member of the clutch when in its retracted position.

7. In a centrifugally operated clutch, in combination, a driving and a driven member, one of said members having a recess therein, a dog radially slidable in said recess under the action of centrifugal force, a retracting spring for said dog comprising a coiled spring arranged with the axis of the coils parallel to the axis of the recessed member, one end of said spring being engaged in a recess in the dog and the other end of the spring being anchored at least in one direction to the recessed member, and means for moving said last-mentioned end of the spring to vary the tension thereof.

8. In a motor vehicle drive, a driving shaft, a driven shaft aligned therewith, means including planetary gearing intermediate said shafts for driving said driven shaft at a speed greater than that of said driving shaft, said intermediate driving means including cooperating clutching members one of which is actuated by centrifugal force for engagement with the other when the speeds of said clutching members are substantially synchronized, said centrifugal force actuated clutching member being drivingly connected with said shafts prior to said clutching engagement for providing a direct drive between said shafts.

9. In a motor vehicle drive, a driving shaft, a driven shaft aligned therewith, means including planetary gearing intermediate said shafts for driving said driven shaft at a speed greater than that of said driving shaft, said intermediate driving means including cooperating clutching members one of which is actuated by centrifugal force for engagement with the other when the speeds of said clutching members are substantially synchronized, said centrifugal force actuated clutching member being drivingly connected with said shafts prior to said clutching engagement for providing a direct drive between said shafts, and an overrunning clutch between said driving and driven shafts adapted to provide an overrunning action between said shafts in response to synchronizing action of said clutching members.

10. In a drive for a motor vehicle having a power driving shaft and a shaft driven therefrom and adapted to drive the vehicle, overdriving means including planetary gearing between said shafts for driving said driven shaft at a speed greater than the speed of the driving shaft, a speed responsive clutch controlling said overdriving means for automatically connecting said shafts through said planetary gearing, said clutch including clutching structures, one of which is adapted for movement in response to centrifugal force for engagement with the other, means for continuously drivingly connecting one of said clutching structures through said planetary gearing with one of said shafts, and means for directly connecting said shafts through the other of said clutching structures prior to clutching movement thereof.

11. In a drive for a motor vehicle having a power driving shaft and a shaft driven therefrom and adapted to drive the vehicle, a centrifugally operated clutching element, means providing a continuous driving connection between said clutching element and said driving shaft, means providing a releasable driving connection between said clutching element and said driven shaft whereby said driving shaft is connected through said clutching element with said driven shaft for transmitting a two-way drive therebetween prior to clutching operation of said clutching element, an overdrive gear train between said shafts for driving said driven shaft from and at a speed faster than said driving shaft, said gear train including a fixed sun gear, a planetary gear having a carrier provided with a slot adapted to clutch with said clutching element when the speeds thereof are substantially synchronized, an internal gear having a continuous driving connection with said driven shaft, said planetary gear meshing with said sun and internal gears, and an overrunning clutch between said shafts adapted to provide relative movement between said shafts to facilitate said synchronization of said slot and clutching element.

12. In a motor vehicle drive, a driving shaft, a driven shaft aligned therewith, means including planetary gearing intermediate said shafts for driving said driven shaft at a speed greater than that of said driving shaft, said intermediate driving means including cooperating clutching members, one of which is movable by centrifugal force for clutching engagement with the other when the speeds of said clutching members are substantially synchronized, means providing a two-way drive between said shafts prior to movement of said movable clutching member into said clutching engagement, and means responsive to movement of said movable clutching member toward its clutching position for rendering said two-way driving means ineffective to provide relative movement between said shafts for synchronizing the speeds of said clutching members.

13. In a motor vehicle drive, a driving shaft, a driven shaft aligned therewith, means including planetary gearing intermediate said shafts for driving said driven shaft at a speed greater than that of said driving shaft, said intermediate driving means including cooperating clutching members, one of which is movable by centrifugal force for clutching engagement with the other when the speeds of said clutching members are substantially synchronized, clutching means providing a two-way direct drive between said shafts, and means responsive to movement of said movable clutching member for controlling said clutching means to synchronize the speeds of said clutching members.

14. In a motor vehicle drive, a driving shaft, a driven shaft aligned therewith, means including planetary gearing intermediate said shafts for driving said driven shaft at a speed greater than that of said driving shaft, said intermediate driving means including cooperating clutching members, one of which is movable by centrifugal force for clutching engagement with the other when the speeds of said clutching members are substantially synchronized, clutching means providing a two-way direct drive between said shafts, and means connecting said movable clutching member with said clutching means so constructed and arranged that movement of said movable clutching member acts on said clutching means to provide overrunning action between said shafts.

15. In a motor vehicle drive, a driving shaft, a driven shaft aligned therewith, means intermediate said shafts for driving said driven shaft from and at a speed greater than said driving shaft, said intermediate driving means including a fixed sun gear, an internal gear having a driving member carried therewith, a planetary gear meshing with said sun and internal gears and having a driving member carried therewith, cooperating clutching members, one of which is movable by centrifugal force for engagement with the other when the speeds of said clutching members are substantially synchronized, one of said clucthing members being drivingly carried by one of said driving members; means for drivingly connecting the other of said clutching members to one of said shafts, means providing a direct two-way drive between said shafts, and means responsive to movement of said movable clutching member for controlling said two-way driving means to provide overrunning relatively between said shafts to synchronize the speeds of said clutching members.

16. In a motor vehicle drive, a driving shaft, a driven shaft aligned therewith, means intermediate said shafts for driving said driven shaft from and at a speed greater than said driving shaft, said intermediate driving means including a fixed sun gear, an internal gear having a driving member carried therewith, a planetary gear meshing with said sun and internal gears and having a driving member carried therewith, cooperating clutching members, one of which is movable by centrifugal force for engagement with the other when the speeds of said clutching members are substantially synchronized, one of said clutching members being drivingly carried by one of said driving members, means for drivingly connecting the other of said clutching members to one of said shafts, two-way driving clutch means between said shafts, and means operatively connecting said movable clutching member with said driving clutch means for rendering said two-way drive inoperative during clutching movement of said movable clutching member.

17. In a motor vehicle drive, a driving shaft, a driven shaft aligned therewith, means intermediate said shafts for driving said driven shaft from and at a speed greater than said driving shaft, said intermediate driving means including a fixed sun gear, an internal gear having a driving member carried therewith, a planetary gear meshing with said sun and internal gears and having a driving member carried therewith, means for drivingly connecting one of said driving members with one of said shafts, the other of said driving members being provided with a slot, a centrifugal force actuated clutching element drivingly connected to the other of said shafts and adapted for clutching engagement with said slot when the speeds of said slot and clutching element are substantially synchronized, means for drivingly connecting said shafts for a direct drive therebetween prior to clutching engagement of said clutching element, and means actuated by movement of said clutching element for controlling said direct driving means.

18. In a drive for a motor vehicle having a power driving shaft and a shaft driven therefrom and adapted to drive the vehicle, overdriving means including planetary gearing between said shafts for driving said driven shaft at a speed greater than the speed of the driving shaft, a speed responsive clutch controlling said overdriving means for automatically connecting said shafts through said planetary gearing, said clutch including clutching structures, one of which is adapted for movement in response to centrifugal force for engagement with the other of said clutching structures, means for continuously driving one of said clutching structures from one of said shafts through said planetary gearing and means for directly connecting said shafts through the other of said clutching structures prior to clutching movement thereof.

19. In a drive for a motor vehicle having a power driving shaft and a shaft driven therefrom and adapted to drive the vehicle, a centrifugally operated engaging clutching member, means providing a continuous driving connection between said clutching member and one of said shafts, interengageable means providing a releasable positive driving connection between said clutching element and the other of said shafts whereby said driving shaft is connected for a two-way drive with said driven shaft through said clutching member, an overdrive gear train between said shafts for driving said driven shaft from and at a speed faster than said driving shaft, said gear train having a part thereof drivingly connected to one of said shafts and a second part thereof adapted for operative connection with the other of said shafts in response to clutching engagement thereof with said clutching member when the latter moves to release said releasable driving connection.

20. In a drive for a motor vehicle having a power driving shaft and a shaft driven therefrom and adapted to drive the vehicle, a centrifugally operated clutching element, means providing a continuous driving connection between said clutching element and said driving shaft, means providing a releasable driving connection between said clutching element and said driven shaft whereby said driving shaft is connected through said clutching element with said driven shaft for transmitting a two-way drive therebetween prior to clutching operation of said clutching element, an overdrive gear train between said shafts for driving said driven shaft from and at a speed faster than said driving shaft, said gear train including a fixed sun gear, a planetary gear having a carrier provided with a slot adapted to clutch with said clutching element when the speeds thereof are substantially synchronized, and an internal gear adapted for driving connection with said driven shaft, said planetary gear meshing with said sun and internal gears.

21. In a drive for a motor vehicle having a power driving shaft and a shaft driven therefrom and adapted to drive the vehicle, overdriving means including planetary gearing elements between said shafts for driving said driven shaft at a speed greater than the speed of the driving shaft, a speed responsive clutch controlling said overdriving means for automatically connecting said shafts through said planetary gearing, said clutch including clutching structures respectively adapted for driving connection with said driving and driven shafts at least when said clutching structures are clutchingly engaged, one of said clutching structures being adapted for movement in response to centrifugal force for engagement with the other of said clutching structures, means for drivingly connecting said planetary gearing to one of said shafts, one of said clutching structures being drivingly connected to an element of said planetary gearing, and means including the other of said clutching structures providing a releasable driving connection between said shafts prior to said clutching engagement of said clutching structures.

22. In a motor vehicle drive, a driving shaft, a driven shaft aligned therewith, means intermediate said shafts for driving said driven shaft from and at a speed greater than said driving shaft, said intermediate driving means including a fixed sun gear, an internal gear having a driving member carried therewith, a planetary gear meshing with said sun and internal gears and having a driving member carried therewith, means for continuously driving one of said driving members directly with one of said shafts, a clutching element continuously drivingly connected with the other of said shafts and adapted for movement by centrifugal force to provide a driving connection between the last said shaft and the other of said driving members, clutch means between said shafts providing a direct drive therebetween, and means operated in response to movement of said clutching element for controlling operation of said clutch means.

23. In a motor vehicle drive, a driving shaft, a driven shaft aligned therewith, means intermediate said shafts for driving said driven shaft from and at a speed greater than said driving shaft, said intermediate driving means including a fixed sun gear, an internal gear having a driving member carried therewith, a planetary gear meshing with said sun and internal gears and having a driving member carried therewith, means for continuously driving one of said driving members directly with one of said shafts, a clutching element continuously drivingly connected with the other of said shafts and adapted for movement by centrifugal force, the other of said driving members having a slot adapted to receive said clutching element in response to approximate synchronization in the speeds thereof and subsequent to said centrifugal force movement of said clutching element, means directly coupling said shafts, and means operably connecting said clutching element with said direct coupling means.

24. In an overdrive for motor vehicles, a driving shaft, a driven shaft, interengageable means providing a releasable positive direct drive between said shafts, means including an overdriving gear train having driving and driven parts thereof adapted for driving connection with said driving and driven shafts respectively, a speed responsive positive clutch controlling the drive through said overdriving gear train means and including relatively movable positive clutching structures respectively adapted for positive driving connection with one of said shafts and an element of said gear train, and means responsive to movement of one of said clutching structures for releasing said direct driving means.

25. In an overdrive for motor vehicles, a driving shaft, a driven shaft, interengageable means providing a releasable positive direct drive between said shafts, means including an overdriving gear train having driving and driven parts thereof adapted for driving connection with said driving and driven shafts respectively, a speed responsive positive clutch controlling the drive through said overdriving gear train means and including relatively movable positive clutching structures respectively adapted for driving connection with one of said shafts and an element of said gear train, one of said clutching structures comprising a centrifugal force operated element adapted for positive clutching engagement with the other of said clutching structures when the speeds thereof are substantially synchronized, and means responsive to movement of said clutching element for controlling said direct driving means.

WILLIAM B. BARNES.